(12) United States Patent
Fukui (10) Patent No.: US 9,708,971 B2
(45) Date of Patent: Jul. 18, 2017

(54) SUPERCHARGED INTERNAL COMBUSTION ENGINE

(71) Applicant: Wataru Fukui, Susono (JP)

(72) Inventor: Wataru Fukui, Susono (JP)

(73) Assignee: TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 0 days.

(21) Appl. No.: 14/889,304

(22) PCT Filed: May 8, 2013

(86) PCT No.: PCT/JP2013/062907
§ 371 (c)(1),
(2) Date: Nov. 5, 2015

(87) PCT Pub. No.: WO2014/181394
PCT Pub. Date: Nov. 13, 2014

(65) Prior Publication Data
US 2016/0084203 A1   Mar. 24, 2016

(51) Int. Cl.
*F02M 25/06* (2016.01)
*F02B 37/12* (2006.01)
(Continued)

(52) U.S. Cl.
CPC ............ *F02B 37/127* (2013.01); *F02B 37/16* (2013.01); *F02M 25/0713* (2013.01);
(Continued)

(58) Field of Classification Search
CPC ... F02B 37/16; F02B 37/127; F02M 25/0713; F02M 25/0717; F02M 25/07;
(Continued)

(56) References Cited

U.S. PATENT DOCUMENTS

| | | | |
|---|---|---|---|
| 8,943,802 B2 * | 2/2015 | Kawaguchi | F01N 3/2013 60/278 |
| 2011/0131975 A1 | 6/2011 | Styles | |
| 2011/0132334 A1 | 6/2011 | Lippa et al. | |

FOREIGN PATENT DOCUMENTS

| | | | |
|---|---|---|---|
| JP | 2007198310 A | * | 8/2007 |
| JP | 2008-175076 A | | 7/2008 |

(Continued)

*Primary Examiner* — Phutthiwat Wongwian
*Assistant Examiner* — Kelsey Stanek
(74) *Attorney, Agent, or Firm* — Andrews Kurth Kenyon LLP (57) ABSTRACT

A supercharged internal combustion engine according to the present invention includes: a compressor arranged in an intake passage through which air that is taken into a combustion chamber flows and for supercharging intake air; an EGR passage that connects an exhaust passage through which exhaust gas that is discharged from the combustion chamber flows and a compressor upstream passage; an EGR valve for opening and closing the EGR passage; an intake bypass passage for releasing gas that has been supercharged by the compressor outside a compressor downstream passage; and an ABV for opening the intake bypass passage by opening when the gas that has been supercharged by the compressor is released outside the compressor downstream passage. The intake bypass passage connects the compressor downstream passage with the EGR passage on the side that is closer to the compressor upstream passage relative to the EGR valve.

2 Claims, 4 Drawing Sheets

(51) Int. Cl.
  *F02B 37/16*  (2006.01)
  *F02M 25/07*  (2006.01)
  *F02M 26/09*  (2016.01)
  *F02M 26/36*  (2016.01)
  *F02M 26/06*  (2016.01)

(52) U.S. Cl.
  CPC ........ *F02M 25/0717* (2013.01); *F02M 26/09* (2016.02); *F02M 26/36* (2016.02); *F02M 26/06* (2016.02); *Y02T 10/144* (2013.01)

(58) Field of Classification Search
  CPC .. F02M 25/0712; F02M 25/08; F02M 25/089; F02M 26/36; F02M 26/10; F02M 26/07; F02M 26/06; F02M 26/19; Y02T 10/144; Y02T 10/47; F01M 13/022; F02D 41/0007; F02D 41/005; F02D 41/003; F02D 41/0042
  USPC ............... 60/272–324; 123/564, 572, 568.29
  See application file for complete search history.

(56) References Cited

FOREIGN PATENT DOCUMENTS

| JP | 2011-241798 A | 12/2011 | |
|---|---|---|---|
| JP | 2012-057582 A | 3/2012 | |
| JP | 2012057582 A * | 3/2012 | |
| JP | 2012-077706 A | 4/2012 | |
| JP | 5056953 B2 * | 10/2012 | ............. F02B 37/16 |

\* cited by examiner

Fig. 5(A) Before ABV actuation

Fig. 5(B) After ABV actuation (before closing EGR valve)

Fig. 5(C) After ABV actuation (after closing EGR valve)

SUPERCHARGED INTERNAL COMBUSTION ENGINE

CROSS-REFERENCE TO RELATED APPLICATION

This is a national phase application based on the PCT International Patent Application No. PCT/JP2013/062907 filed May 8, 2013, the entire contents of which are incorporated herein by reference.

TECHNICAL FIELD

The present invention relates to a supercharged internal combustion engine, and more particularly to a supercharged internal combustion engine which adopts a configuration in which exhaust gas is recirculated into an intake passage on an upstream side of a compressor for supercharging intake air.

BACKGROUND

For example, Patent Literature 1 discloses an internal combustion engine which includes a turbosupercharger. This internal combustion engine includes an exhaust gas recirculation passage (EGR passage) for introducing recirculated exhaust gas (EGR gas) into an intake passage on a downstream side of a compressor of the turbosupercharger, and an exhaust gas recirculation valve (EGR valve) for opening and closing the EGR passage. The aforementioned internal combustion engine further includes an air bypass passage that connects a portion of the intake passage on the downstream side of the compressor and a portion of the intake passage on an upstream side of the compressor, and an air bypass valve that is configured to open when the operation of the engine transitions from a supercharging operation state to a deceleration operation state to thereby open the air bypass passage. The air bypass passage is connected to a portion of the intake passage on an upstream side of a connection portion of the EGR passage.

In an internal combustion engine which includes an EGR passage and an air bypass passage having the similar configuration to the ones of the internal combustion engine described in Patent Literature 1, if the air bypass valve is opened when a predetermined condition for opening the air bypass valve is met in a situation in which EGR gas is being introduced into the intake passage through the EGR passage, the air that includes EGR gas will be recirculated via the air bypass passage into the intake passage on the upstream side of the compressor. If the EGR valve is open continuously after the air bypass valve is opened in such a situation, the introduction of EGR gas into the intake passage will be continued. As a result, the gas that is taken into the compressor again corresponds to a gas that is obtained by, after the recirculation of the air, adding an EGR gas with respect to the air that has already been mixed with an EGR gas. Therefore, in the aforementioned situation, if the EGR valve cannot be closed with a high responsivity concurrently with the opening of the air bypass valve, intake air that includes a higher concentration of EGR gas than initially envisioned may be introduced into a cylinder. Consequently, there is a concern that torque fluctuation or misfire may occur.

Including the above described literature, the applicant is aware of the following literature as literature related to the present invention.

CITATION LIST

Patent Literature

Patent Literature 1: Japanese Laid-open Patent Application Publication No. 2011-241798
Patent Literature 2: Japanese Laid-open Patent Application Publication No. 2012-057582

SUMMARY

The present invention has been made to address the problem as described above, and has its object to provide a supercharged internal combustion engine which can prevent an increase in the concentration of recirculated exhaust gas in a gas that is taken into a compressor when a bypass valve is opened.

The present invention is a supercharged internal combustion engine that includes a compressor, an exhaust gas recirculation passage, an exhaust gas recirculation valve, a bypass passage and a bypass valve. The compressor is arranged in an intake passage through which air that is taken into a combustion chamber flows and supercharges intake air. The exhaust gas recirculation passage connects an exhaust passage through which exhaust gas that is discharged from the combustion chamber flows and a compressor upstream passage that is the intake passage on an upstream side of the compressor. The exhaust gas recirculation valve is provided for opening and closing the exhaust gas recirculation passage. The bypass passage is provided for releasing gas that has been supercharged by the compressor outside a compressor downstream passage that is the intake passage on a downstream side of the compressor. The bypass valve opens the bypass passage by opening when the gas that has been supercharged by the compressor is released outside the compressor downstream passage. The bypass passage according to the present invention connects the compressor downstream passage with the exhaust gas recirculation passage or the exhaust passage.

According to the present invention, when the bypass valve is opened to release supercharged gas outside the compressor downstream passage, a high-pressure supercharged gas is introduced into the exhaust gas recirculation passage or the exhaust passage. As a result of this, when the high-pressure supercharged gas is introduced into the exhaust gas recirculation passage, the inflow of a new recirculated exhaust gas from the exhaust passage side is suppressed due to the high-pressure supercharged gas even when the exhaust gas recirculation valve is open. This can prevent an increase in the concentration of the recirculated exhaust gas that is contained in the gas that is taken into the compressor at the time of opening the bypass valve. This similarly applies to a case in which a high-pressure supercharged gas is introduced into the exhaust passage. More specifically, in a case in which a high-pressure supercharged gas is introduced into the exhaust passage on the upstream side of the exhaust gas recirculation passage, the exhaust gas recirculation gas that flows into the compressor upstream passage in this case is a mixture gas of the aforementioned supercharged gas and the exhaust gas from the combustion chamber even if the recirculated exhaust gas flows into the compressor upstream passage after opening the bypass valve due to the fact that the exhaust gas recirculation valve is open. That is to say, the concentration of the recirculated exhaust gas in the mixture gas is lower than that of the recirculated exhaust gas that is at a normal time and that does not includes the supercharged gas. Accordingly, even if such gas is mixed with the fresh air that flows through the compressor upstream passage, the concentration of the recirculated exhaust gas that is contained in the gas that is taken into the compressor does not become higher than that at the time of introduction of a normal recirculated exhaust gas. In addition, when a high-pressure supercharged gas is introduced into the exhaust passage on the downstream side than the exhaust gas recirculation passage, the high-pressure supercharged gas is simply released into the atmospheric air through the exhaust passage on the downstream side relative to a connection portion with the exhaust gas recirculation passage. As just described, also in this case there is no recirculation itself of the aforementioned supercharged gas into the upstream of the compressor, and therefore, the concentration of the recirculated exhaust gas that is contained in the gas that is taken into the compressor does not become high due to the presence of this gas.

Moreover, the present invention may further include an air flow meter that is arranged in the compressor upstream passage on an upstream side of a connection portion with the exhaust gas recirculation passage and measures a flow rate of air through which the compressor upstream passage flows. Furthermore, the bypass passage may be connected to the exhaust gas recirculation passage on a side that is closer to the compressor upstream passage relative to the exhaust gas recirculation valve.

As just described, by connecting the bypass passage to the exhaust gas recirculation passage on the side that is closer to the compressor upstream passage relative to the exhaust gas recirculation valve, an occurrence of the air amount that is not measured by the air flow meter that is arranged at the aforementioned position can be prevented at the time of opening the bypass passage.

Moreover, the present invention may further include a catalyst that is arranged in the exhaust passage and purifies exhaust gas. Furthermore, the exhaust gas recirculation passage may be connected to the exhaust passage on a downstream side of the catalyst.

According to this configuration, the recirculated exhaust gas that is contained in the gas that is introduced into the exhaust gas recirculation passage or the exhaust passage from the bypass passage is a gas that has already passed through the aforementioned catalyst. Therefore, even when the supercharged gas from the bypass passage is released into the atmospheric air from the exhaust passage without being recirculated into the compressor upstream passage, the deterioration of exhaust emissions can be prevented.

DESCRIPTION OF EMBODIMENTS

First Embodiment

First, a first embodiment of the present invention will be described with reference to FIG. 1 to FIG. 3(B).

Figure 1:
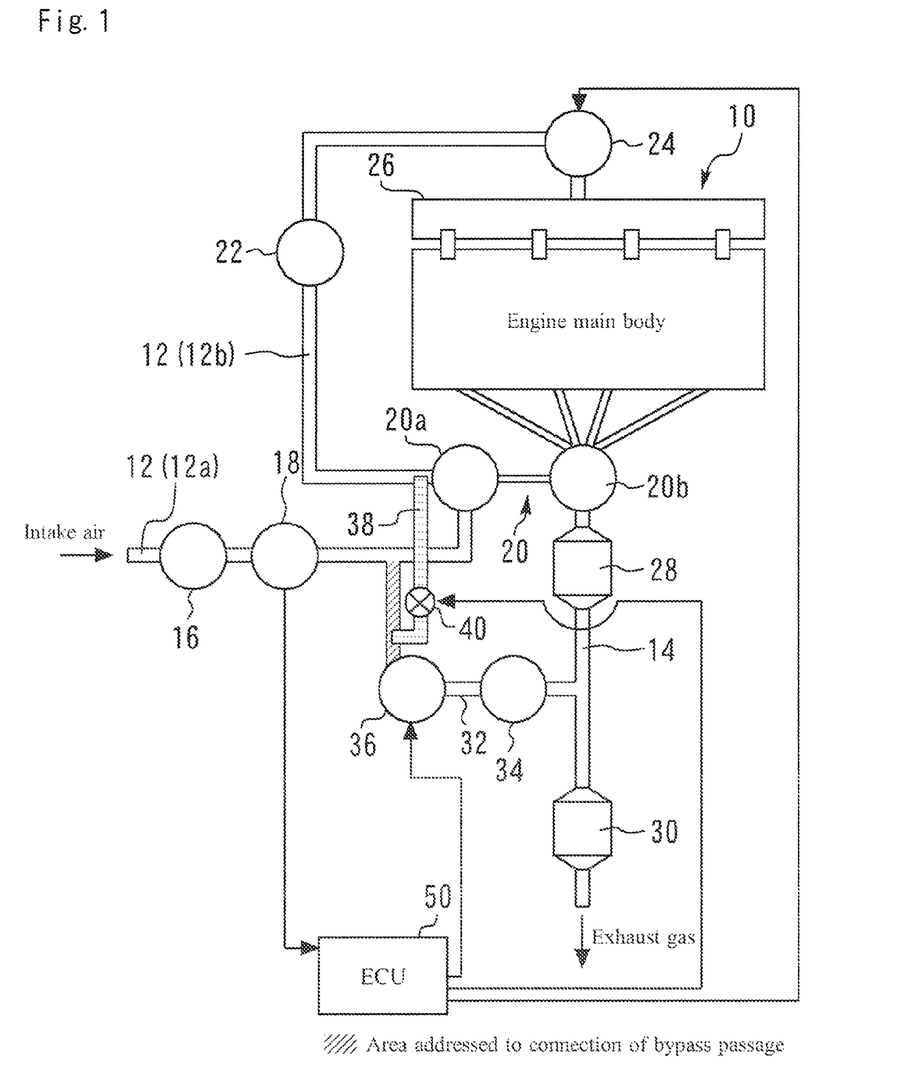
FIG. 1 is a diagram for explaining a system configuration of an internal combustion engine according to a first embodiment of the present invention.

FIG. 1 is a diagram for explaining a system configuration of an internal combustion engine 10 according to the first embodiment of the present invention. The system shown in FIG. 1 includes the internal combustion engine 10. The internal combustion engine 10 is mounted in the vehicle and used as its power source. Although the internal combustion engine 10 according to the present embodiment is shown as, for example, an in-line four-cylinder engine, the number and arrangement of cylinders of an internal combustion engine according to the present invention are not limited to the foregoing. The internal combustion engine 10 includes an intake passage 12 through which the air that is taken into combustion chambers (not shown in the drawings) flows and an exhaust passage 14 through which the gas that is discharged from the combustion chambers flows.

An air cleaner 16 is provided near the inlet of the intake passage 12. An air flow meter 18 for measuring a flow rate of the air that is taken into the intake passage 12 is provided downstream of the air cleaner 16. A compressor 20a of a turbosupercharger 20 is arranged downstream of the air flow meter 18. The turbosupercharger 20 includes a turbine 20b that is integrally coupled to the compressor 20a and that operates by means of exhaust energy. The compressor 20a is driven to rotate by the exhaust energy of exhaust gas that enters the turbine 20b.

Further, at the intake passage 12 on the downstream side of the compressor 20a (hereinafter, abbreviated to as a "compressor downstream passage 12b" in some cases), an intercooler 22 is arranged to cool the air that is compressed by the compressor 20a. Furthermore, at the downstream of the intercooler 22, a throttle valve 24 is arranged to adjust the amount of the air that flows through the intake passage 12. A surge tank 26 is arranged downstream of the throttle valve 24.

The turbine 20b of the turbosupercharger 20 is arranged at a certain location in the exhaust passage 14. At the exhaust passage 14 on the downstream side of the turbine 20b, an upstream catalyst 28 and downstream catalyst 30 that are three way catalysts are arranged in that order from the upstream side, as catalysts for purifying exhaust gas.

Moreover, the system shown in FIG. 1 includes an exhaust gas recirculation passage (EGR passage) 32 that functions as a low pressure exhaust gas recirculation passage (LPL (Low Pressure Loop)). The EGR passage 32 is configured so as to connect the exhaust passage 14 on the downstream side of the turbine 20b (in the present embodiment, on the further downstream side than the upstream catalyst 28) and the intake passage 12 on the upstream side of the compressor 20a (hereinafter, abbreviated to as a "compressor upstream passage 12a" in some cases). In that order from the upstream side of EGR gas flow when introducing recirculated exhaust gas (EGR gas) into the compressor upstream passage 12a via the EGR passage 32 (that is, on the side that is closer to the exhaust passage 14), an exhaust gas recirculation cooler (EGR cooler) 34 and an exhaust gas recirculation valve (EGR valve) 36 are arranged at certain locations in the EGR passage 32. Note that, in the internal combustion engine 10 according to the present embodiment, the EGR valve 36 may be arranged at the end of the EGR passage 32 on the exhaust passage 14 side, instead of at a certain location in the EGR passage 32.

The EGR cooler 34 is provided for cooling the exhaust gas (EGR gas) that is introduced into the EGR passage 32. The EGR valve 36 is a valve for opening and closing the EGR passage 32 and, more specifically, for adjusting the flow rate pf EGR gas that is introduced into the compressor upstream passage 12a via the EGR passage 32 by changing the flow passage cross-sectional area of the EGR passage 32. With utilizing the LPL (EGR passage 32) as above, EGR gas can be introduced even in a supercharging range of the internal combustion engine 10, unlike a case where a configuration in which an EGR passage is connected to a compressor downstream passage.

Further, the system shown in FIG. 1 includes an intake bypass passage 38 for returning intake air that is supercharged by the compressor 20a to the compressor upstream passage 12a. One end of the intake bypass passage 38 is connected to the compressor downstream passage 12b at a portion between the compressor 20a and the intercooler 22.

The intake bypass passage 38 according to the present embodiment has a feature in that the other end thereof is connected to the EGR passage 32 at the side that is closer to the compressor upstream passage 12a relative to the EGR valve 36. That is to say, an area on the downstream side of the EGR valve 36 and on the upstream side of a merging portion of EGR gas and fresh air (intake air side end of the EGR passage 32) in respect of the gas flow at the time of introduction of EGR gas corresponds to an area that is addressed to connection of an outlet of the intake bypass passage 38 according to the present embodiment, as shown by the hatch pattern in FIG. 1.

At a certain location of the intake bypass passage 38, an intake bypass valve (ABV) 40 for opening and closing the intake bypass passage 38 is arranged. The ABV 40 is configured to open when it is required to allow the gas (intake air) that is supercharged by the compressor 20a to be released outside the compressor downstream passage 12b via the intake bypass passage 38 and thereby open the intake bypass passage 38. Furthermore, the ABV 40 is opened in a case (such as, a case of transitioning from a supercharging operation state to a deceleration operation state) in which a gas flow from the compressor downstream passage 12b into the EGR passage 32 is generated in association with opening of the intake bypass passage 38 due to the fact that the pressure on the compressor downstream 12b side corresponding to the inlet side of the intake bypass passage 38 is higher than the pressure on the EGR passage 32 side corresponding to the outlet side of the intake bypass passage 38. Note that, the ABV 40 may be arranged at either end of the intake bypass passage 38.

The system according to the present embodiment further includes an electronic control unit (ECU) 50. There are connected in an input section of the ECU 50, various types of sensors for detecting the operation state of the internal combustion engine 10, such as the air flow meter 18 described above. In addition, there are connected in an output section of the ECU 50, various types of actuators for controlling the operation of the internal combustion engine 10, such as a fuel injection valve (not shown in the drawings) as well as the throttle valve 24, the EGR valve 36 and the ABV 40 that are described above. The ECU 50 controls the operation of the internal combustion engine 10 by driving the aforementioned various actuators based on the outputs of the aforementioned various sensors and predetermined programs.

Figure 2:
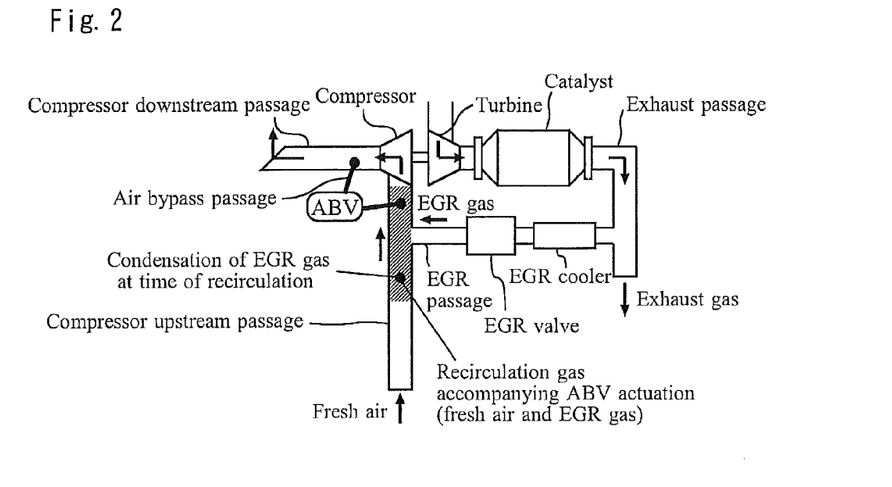
FIG. 2 is a diagram that is referred for comparison with the configuration according to the first embodiment of the present invention.

FIG. 2 is a diagram that is referred for comparison with the configuration according to the first embodiment of the present invention, and shows an intake bypass passage having a general configuration concerning the connection. As shown in FIG. 2, an intake bypass passage generally connects a compressor downstream passage with a compressor upstream passage. In addition, when an EGR passage that functions as an LPL is provided, EGR gas can be introduced even in a supercharging range, as already described. In the configuration shown in FIG. 2, if an ABV is opened when a predetermined condition for opening the ABV is met in a situation in which EGR gas is being introduced into the compressor upstream passage via the EGR passage, the air that includes EGR gas (fresh air and EGR gas) will be recirculated into the compressor upstream passage via the intake bypass passage.

An EGR valve is basically closed in association with the opening of the ABV. However, due to a response delay of the EGR valve or the like, if the EGR valve is open continuously after the ABV is opened under the aforementioned situation, introduction of EGR gas into the compressor upstream passage will be continued. As a result, the gas that is taken into a compressor again corresponds to a gas that is obtained by, after the recirculation of the air, adding an EGR gas with respect to the air that has already been mixed with an EGR gas. Therefore, in the aforementioned situation, if the EGR valve cannot be closed with a high responsivity concurrently with the opening of the ABV, intake air that includes a higher concentration of EGR gas than initially envisioned may be introduced into a cylinder. Consequently, there is a concern that torque fluctuation or misfire may occur. In addition, although it is required to enhance the responsivity of the EGR valve so as to be equal to or higher than that of the ABV in order to avoid the condensation of EGR gas at the time of the aforementioned actuation (opening) of the ABV, a high cost is required to obtain such high responsivity.

Figure 3A:
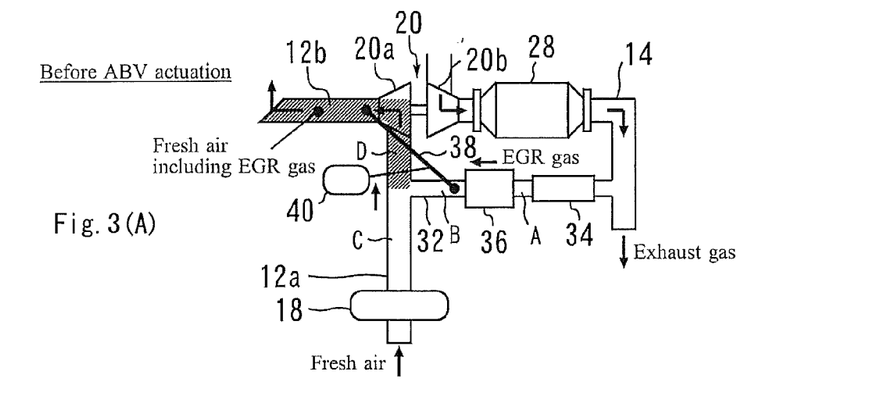
FIG. 3(A) and FIG. 3(B) include diagrams for explaining a gas flow before and after actuation of an ABV in the configuration according to the first embodiment of the present invention.
Figure 3B:
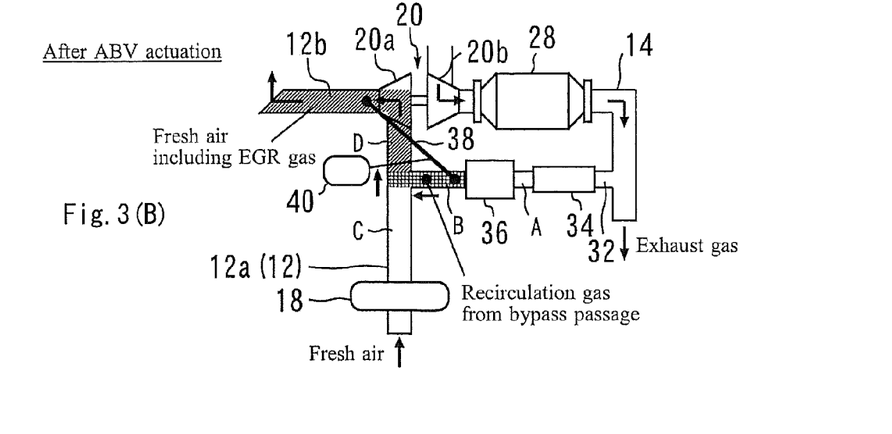

FIG. 3(A) and FIG. 3(B) include diagrams for explaining a gas flow before and after actuation of the ABV 40 in the configuration according to the first embodiment of the present invention. Note that, it is assumed that FIG. 3(A) and FIG. 3(B) show a situation in which introduction of EGR gas is performed by using the EGR passage 32 in a supercharging range.

FIG. 3(A) corresponds to a state before actuation of the ABV 40 (closed state). In the state, since the pressure in a portion A shown in FIG. 3(A) is higher than the pressure in a portion B, the EGR gas flows toward the compressor upstream passage 12a due to a difference in the aforementioned pressures. In addition, although the pressure in a portion C is substantially the same as the pressure in a portion D, the flow direction of gas in the compressor upstream passage 12a is a direction toward the portion D from the portion C. As a result, the gas that flows through the intake passage 12 on the downstream side of the connection portion between the compressor upstream passage 12a and the EGR passage 32 is fresh air that includes EGR gas as shown in FIG. 3(A).

On the other hand, FIG. 3(B) corresponds to a state after actuation of the ABV 40 (open state). As already described, since the ABV 40 is opened when the supercharging pressure is high, in the state shown in FIG. 3(B) the pressure in the portion B to which a high pressurized gas is supplied from the intake bypass passage 38 becomes higher the pressure in the portion A. Because of this, in the state the flow of EGR gas from the exhaust passage 14 side does not occur. More specifically, a normal flow of EGR gas is blocked due to a high pressurized recirculation gas from the intake bypass passage 38. In addition, the pressure in the portion A is higher than the pressures in the portions C and D. Accordingly, the recirculation gas from the intake bypass passage 38 flows toward the portions C and D from the portion B as shown in FIG. 3(B). Furthermore, as described above, the flow of gas toward the portion D from the portion C is present in the compressor upstream passage 12a. Consequently, the aforementioned recirculation gas after being introduced into the compressor upstream passage 12a from the EGR passage 32 flows toward the compressor 20a as shown in FIG. 3(C).

As described so far, in the internal combustion engine 10 according to the present embodiment, the intake bypass passage 38, which is provided for releasing supercharged air that flows at the downstream side of the compressor 20a outside the compressor downstream passage 12b (in the present embodiment, for recirculating it upstream of the compressor 20a), is connected to the EGR passage 32 at a portion on the side that is closer to the compressor upstream passage 12a relative to the EGR valve 36 (hereinafter, the portion is abbreviated to an "EGR valve downstream portion" in some cases). Therefore, since the a high pressurized recirculation gas is returned to the EGR valve downstream portion at the time of opening the ABV 40, a difference in pressures before and after the EGR valve 36 reverses as compared with that at the time of introducing the EGR gas normally. As a result of this, even when the EGR valve 36 is open after (immediately after) opening the ABV 40, an EGR gas can be prevented from being newly introduced into the compressor upstream passage 12a from the EGR passage 32. This can prevent the concentration of EGR gas that is contained in the gas that is recirculated into the upstream of the compressor 20a from being high in association with actuation (opening) of the ABV 40. Thus, an occurrence of torque fluctuation or misfire can be avoided in association with such condensation of EGR gas.

In further addition to that, in the internal combustion engine 10 according to the present embodiment, the connection portion of the intake bypass passage 38 with respect to the EGR passage 32 is provided not at the side that is closer to the exhaust passage 14 relative to the EGR valve 36 (at the upstream side of EGR gas flow) but at the side that is closer to the intake passage 12 relative to the EGR valve 36 (at the downstream side of EGR gas flow), and the following advantageous effects can thereby be achieved. More specifically, if a configuration is adopted so that a connection portion of an intake bypass passage with respect to an EGR passage is provided at the side that is closer to an exhaust passage relative to an EGR valve, the recirculation gag from the intake bypass passage (fresh air that includes EGR gas) is discharged to the exhaust passage via the EGR passage (i.e. as a result of reflux from the EGR passage) in a situation that is after the EGR valve is closed during opening the ABV. As a result of this, all amount of the fresh air that has passed through an air flow meter ceases to be taken into a combustion chamber. This produces a deviation in air-to-fuel ratio that is controlled using the air flow rate that is measured by the air flow meter, and becomes a factor of deterioration of exhaust emissions. In addition, in a case in which a configuration is adopted so that a catalyst (in the internal combustion engine 10, the downstream catalyst 30 corresponds to this) is provided at the downstream side of a connection portion of an exhaust passage and an EGR passage as in the internal combustion engine 10 of the present embodiment, the atmosphere gas of the catalyst becomes lean due to the fresh air in the aforementioned recirculation gas that has been discharged to the exhaust passage through the EGR passage. This also becomes a factor of deterioration of exhaust emissions.

In contrast, according to the internal combustion engine 10 in the present embodiment in which a configuration is adopted so that a connection portion of the intake bypass passage 38 with respect to the EGR passage 32 is provided at the side that is closer to the intake passage 12 relative to the EGR valve 36, a part of fresh air that has passed through the air flow meter 18 can be prevented from ceasing to be taken into the combustion chamber under a situation in which the ABV 40 is open and the EGR valve 36 is in a closed state. Furthermore, since the flow of the aforementioned recirculation gas into the exhaust passage 14 through the EGR passage 32 can be prevented under the aforementioned situation, the atmosphere gas of the downstream catalyst 30 can be prevented from being made lean due to the recirculation gas.

In the first embodiment, explanation has been made by taking as an example the configuration in which the EGR passage 32 is connected to the exhaust passage 14 at a portion between the upstream catalyst 28 and the downstream catalyst 30. However, in a case in which the outlet of the intake bypass passage 38 is connected to the EGR valve downstream portion of the EGR passage 32 as in the intake bypass passage 38 in the present embodiment, the recirculation gas from the intake bypass passage 38 does not flow toward the exhaust passage 14 side, and therefore, a connection portion of the exhaust passage 14 and the EGR passage 32 is not limited to the foregoing and may be an arbitrary portion in the exhaust passage 14.

It is noted that in the above described first embodiment, the intake bypass passage 38 corresponds to the "bypass passage" according to the present invention, and the ABV 40 corresponds to the "bypass valve" according to the present invention.

Second Embodiment

Next, a second embodiment of the present invention will be described with reference to FIG. 4 and FIG. 5(A) to FIG. 5(C).

Figure 4:
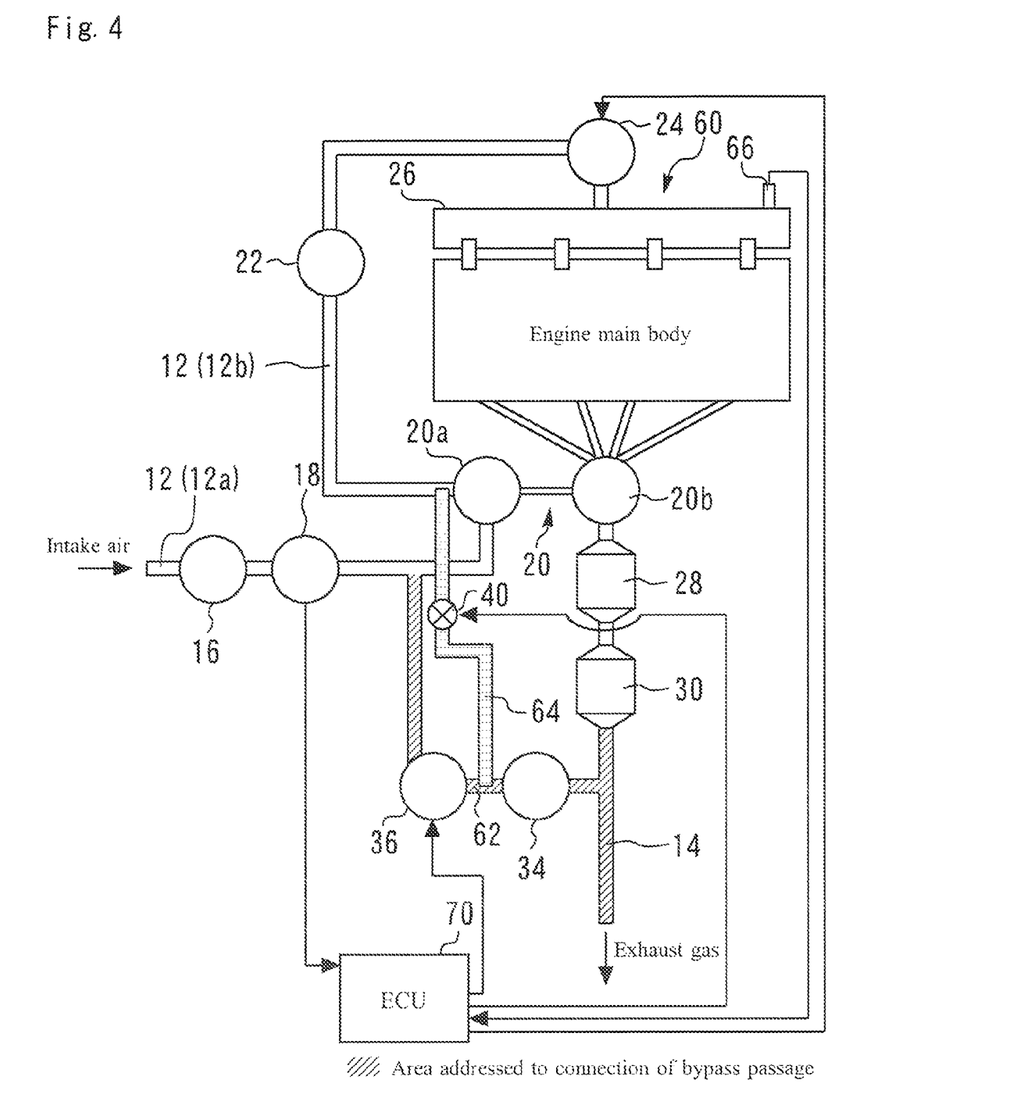
FIG. 4 is a diagram for explaining a system configuration according to an internal combustion engine according to a second embodiment of the present invention.

FIG. 4 is a diagram for explaining a system configuration according to an internal combustion engine 60 the second embodiment of the present invention. Note that, in FIG. 4, the same elements as that shown in above described FIG. 1 are given the same reference characters thereby omitting or simplifying the description thereof.

An EGR passage 62 that the internal combustion engine 60 shown in FIG. 4 includes is configured as a passage that connects the compressor upstream passage 12a with the exhaust passage 14 on the downstream side of the downstream catalyst 30. Here, the downstream catalyst 30 is assumed to be a catalyst that is provided at the most downstream side out of catalysts that are arranged in the exhaust passage 14. Note that, in the internal combustion engine 60 according to the present embodiment, the EGR valve 36 may be arranged at the end of the EGR passage 62 on the intake passage 12 side, instead of a certain location in the EGR passage 62.

Moreover, an intake bypass passage 64 according to the present embodiment is connected to the EGR passage 62 at the side that is closer to the exhaust passage 14 relative to the EGR valve 36 (more specifically, a portion between the EGR valve 36 and the EGR cooler 34). The ABV 40 is arranged at a certain location in the intake bypass passage 64. Furthermore, in the present embodiment, an intake pressure sensor 66 is provided instead of the air flow meter 18 in order to obtain (calculate) an intake air flow rate. The intake pressure sensor 66 is attached to the surge tank 26 to detect a downstream pressure of the throttle valve 24. The intake pressure sensor 66 is connected to the ECU 70.

Figure 5A:
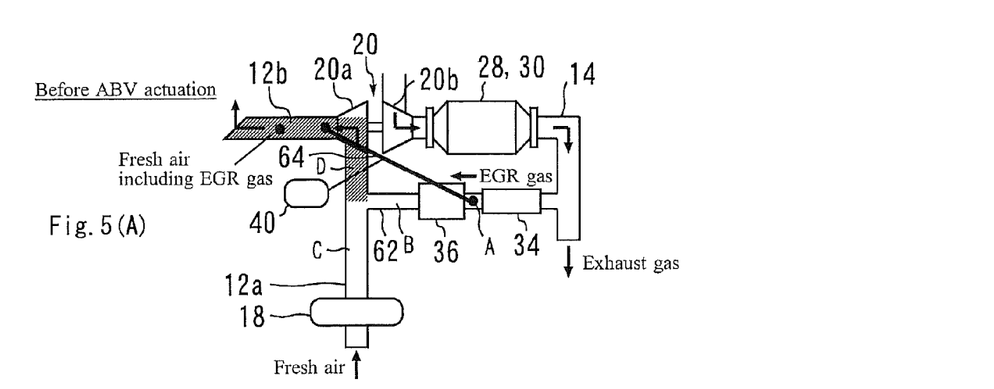
FIG. 5(A) to FIG. 5(C) include diagrams for explaining a gas flow before and after actuation of the ABV in the configuration according to the second embodiment of the present invention.
Figure 5B:
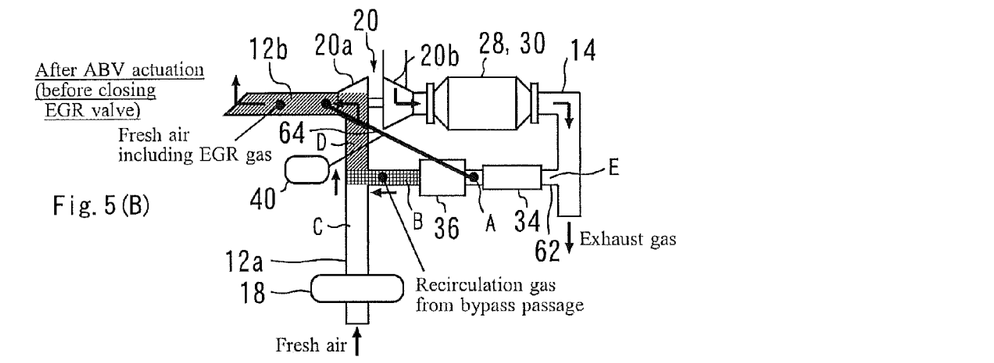
Figure 5C:
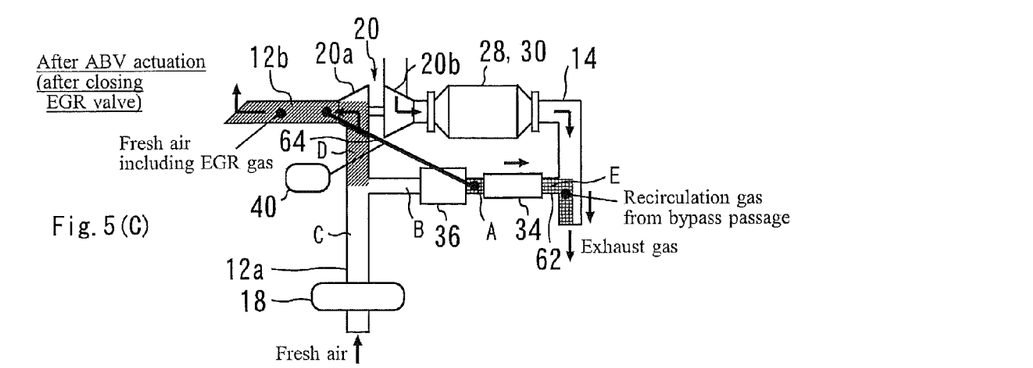

FIG. 5(A) to FIG. 5(C) include diagrams for explaining a gas flow before and after actuation of the ABV 40 in the configuration according to the second embodiment of the present invention. Note that FIG. 5(A) to FIG. 5(C) are assumed to show a situation in which introduction of EGR gas is performed using the EGR passage 32 in the supercharging range.

FIG. 5(A) corresponds to a state before actuation of the ABV 40 (closed state). The state is similar to the state described above with reference to FIG. 3(A), and in the state, since the pressure in the portion A shown in FIG. 5(A) is higher than the pressure in the portion B, a difference in the pressures allows the EGR gas to flow toward the compressor upstream passage 12*a*. In addition, although the pressure in the portion C and the pressure in the portion D are substantially the same, the flow direction of gas in the compressor upstream passage 12*a* is a direction toward the portion D from the portion C. Accordingly, the gas that flows through the intake passage 12 on the downstream side of the connection portion between the compressor upstream passage 12*a* and the EGR passage 62 is fresh air that includes EGR gas as shown in FIG. 5(A).

On the other hand, FIG. 5(B) corresponds to a state after actuation of the ABV 40 (open state) and a state before closing the EGR valve 36. As already described, the ABV 40 is opened when the supercharging pressure is high, and in that state, the pressure in the portion A into which a high pressurized gas is supplied from the intake bypass passage 38 becomes higher than the pressure in the portion B. In addition, the pressure in the portion B that is communicated with the compressor upstream passage 12*a* is lower than the pressure in a portion E that is communicated with the exhaust passage 14. As a result of this, the recirculation gas that has been introduced into the EGR passage 62 from the intake bypass passage 64 flows toward the portion B from the portion A as shown in FIG. 5(B). In this state, since the pressure in the portion A is higher than the pressure in the portion E, a normal flow of EGR gas is blocked due to a high pressurized recirculation gas from the intake bypass passage 38, and as a result, the flow of EGR gas from the exhaust passage 14 side does not occur. Furthermore, in the compressor upstream passage 12*a,* there is a gas flow toward the portion D from the portion C. The recirculation gas therefore flows toward the compressor 20*a* as shown in FIG. 5(B), in a situation that is after the recirculation gas is introduced into the compressor upstream passage 12*a* from the EGR passage 62.

FIG. 5(C) corresponds to a state in which the EGR valve 36 is closed and the recirculation gas from the intake bypass passage 64 is still present after the state shown in FIG. 5(B) has been reached. In that state, since the EGR valve 36 is in a closed state, the gas that has been introduced into the EGR passage 62 from the intake bypass passage 64 is discharged into the exhaust passage 14 through the EGR passage 62 (i.e. as a result of reflux from the EGR passage) as shown in FIG. 5(C).

As described so far, also in the configuration of the internal combustion engine 60 according to the present embodiment, the intake bypass passage 64 is connected to the EGR passage 62 (to the portion on the upstream side of EGR gas flow relative to a portion at which the EGR gas is merged with fresh air that flows through the compressor upstream passage 12*a*. Because of this, even when the EGR valve 36 is open after (immediately after) the ABV 40 is opened, an EGR gas can be prevented from being newly introduced into the compressor upstream passage 12*a* from the EGR passage 62. Thus, according to such connecting configuration also, the concentration of EGR gas that is contained in the gas that is recirculated into the upstream of the compressor 20*a* can be prevented from becoming high in association with actuation (opening) of the ABV 40.

Moreover, in the internal combustion engine 60 according to the present embodiment, the intake air flow rate is calculated using the intake pressure sensor 66. Because of this, even when the gas (including fresh air) that has been introduced into the EGR passage 62 from the intake bypass passage 64 is discharged to the exhaust passage 14 without being taken into the compressor 20*a* as shown in FIG. 5(C), a deviation in air-to-fuel ratio that is used for the control of the internal combustion engine 60 can be prevented from being produced. Furthermore, the EGR passage 62 is connected to the exhaust passage 14 on the downstream side relative to the downstream catalyst 30. Accordingly, even when the gas (including fresh air) is introduced into the EGR passage 62 from the intake bypass passage 64 as shown in FIG. 5(C), an influence of the gas on (the purification window of) the downstream catalyst 30 can be avoided. As described above, according to the configuration in the present embodiment, the flexibility of choice of a connection portion of the intake bypass passage 64 can be enhanced as compared with the configuration in the first embodiment, without affecting acquisition of the intake air flow rate and the state of the catalyst.

In the second embodiment, explanation has been made by taking as an example the intake bypass passage 64 that is connected with the EGR passage 62 on the side that is closer to the exhaust passage 14 relative to the EGR passage 36 (more specifically, the portion between the EGR valve 36 and the EGR cooler 34). However, an area that is addressed to the connection of the outlet of the intake bypass passage 64 in the internal combustion engine 60 according to the present embodiment is not limited to the foregoing, and may be a portion represented by a hatch pattern in FIG. 4. That is to say, the connection position of the outlet of the intake bypass passage 64 may be an arbitrary portion in the EGR passage 62, or be the exhaust passage 14 as explained later.

The connection position of the outlet of the intake bypass passage 64 may, for example, be the exhaust passage 14 on the upstream side relative to the connection portion with the EGR passage 62, instead of the EGR passage 62. In a case of this configuration, the gas (supercharged air that includes EGR gas) is introduced through the intake bypass passage 64 into the exhaust passage 14 on the upstream side relative to the connection portion with the EGR passage 62, in association with opening of the ABV 40. This gas is mixed with the exhaust gas that flows through the exhaust passage 14. Then, if the EGR valve v36 is open, a part of this mixed gas is introduced into the compressor upstream passage 12*a* through the EGR passage 62. The mixed gas that is introduced into the compressor upstream passage 12*a* from the EGR passage as above is a gas having a low EGR ratio due to the presence of fresh air that is contained in the recirculation gas, as compared with a case in which the recirculation gas from the intake bypass passage 64 is not present (a case in which introduction of a normal EGR gas (an EGR ratio 100% gas) is performed). Accordingly, even if, after the ABV 40 is opened, such mixed gas is introduced into the compressor upstream passage 12*a* and is mixed with fresh air, the concentration of EGR gas that is contained in the gas that is taken into the compressor 20*a* does not become higher as compared with that at the time of introduction of a normal EGR gas. That is to say, even when such configuration is adopted, the concentration of EGR gas that is contained in the gas that is recirculated into the upstream of the compressor 20a can be prevented from becoming high in association with actuation (opening) of the ABV 40.

Moreover, the connection position of the outlet of the intake bypass passage 64 may, for example, be the exhaust passage 14 on the downstream side relative to the connection portion with the EGR passage 62, instead of the EGR passage 62. In a case of this configuration, the gas (supercharged air that includes EGR gas) is discharged into the atmospheric air, through the intake bypass passage 64 and then the exhaust passage 14 on the downstream side relative to the connection portion with the EGR passage 62. As above, in this case there is no recirculation itself of the gas from the intake bypass passage 64 into the upstream of the compressor 20a, and therefore, the concentration of EGR gas that is contained in the gas that is taken into the compressor 20a does not become high due to the presence of this gas. That is to say, even when such configuration is adopted, the concentration of EGR gas that is contained in the gas that is taken into the compressor 20a can be prevented from becoming high in association with actuation (opening) of the ABV 40.

Furthermore, in the internal combustion engine 60 shown in FIG. 4, the EGR passage 62 is connected to the exhaust passage 14 on the downstream side relative to the downstream catalyst 30. Therefore, even when the configuration is adopted so that the outlet of the intake bypass passage 64 is connected to the exhaust passage 14 as above, since the EGR gas that is contained in the gas that is introduced into the exhaust passage 14 from the intake bypass passage 64 is a gas that has already been passed through the downstream catalyst 30 and the like, exhaust emissions are not deteriorated.

It is noted that in the above described second embodiment, the intake bypass passage 64 corresponds to the "bypass passage" according to the present invention; and the ABV 40 corresponds to the "bypass valve" according to the present invention; and the downstream catalyst 30 corresponds to the "catalyst" according to the present invention.

In the first and second embodiments, as a compressor for supercharging intake air, explanation has been made by taking as an example the compressor 20a of the turbosupercharger 20 that utilizes exhaust energy as its driving force. However, the compressor according to the present invention is not limited to the one that is included by a turbosupercharger. That is to say, the compressor according to the present invention may, for example, be driven by a power from a crankshaft of an internal combustion engine, or be driven by an electric motor.

DESCRIPTION OF SYMBOLS 10, 60 internal combustion engine
12 intake passage
12a compressor upstream passage of intake passage
12b compressor downstream passage of intake passage
14 exhaust passage
16 air cleaner
18 air flow meter
20 turbosupercharger
20a compressor of turbosupercharger
20b turbine of turbosupercharger
22 intercooler
24 throttle valve
26 surge tank
28 upstream catalyst
30 downstream catalyst
32, 62 exhaust gas recirculation passage (EGR passage)
34 exhaust gas recirculation cooler (EGR cooler)
36 exhaust gas recirculation valve (EGR valve)
38, 64 intake bypass passage
40 intake bypass valve (ABV)
50, 70 electronic control unit (ECU)
66 intake pressure sensor

The invention claimed is:

1. A supercharged internal combustion engine, comprising:
a compressor arranged in an intake passage through which air that is taken into a combustion chamber flows and configured to supercharge intake air;
an exhaust gas recirculation passage that connects an exhaust passage through which exhaust gas that is discharged from the combustion chamber flows and a compressor upstream passage that is the intake passage on an upstream side of the compressor;
an exhaust gas recirculation valve configured to open and close the exhaust gas recirculation passage;
a bypass passage for releasing gas that has been supercharged by the compressor outside a compressor downstream passage that is the intake passage on a downstream side of the compressor;
a bypass valve configured to open the bypass passage by opening when the gas that has been supercharged by the compressor is released outside the compressor downstream passage; and
an air flow meter arranged in the compressor upstream passage on an upstream side of a connection portion with the exhaust gas recirculation passage and for measuring a flow rate of air through which the compressor upstream passage flows,
wherein the bypass passage connects the compressor downstream passage with the exhaust gas recirculation passage, and
wherein the bypass passage is connected to the exhaust gas recirculation passage on a side that is closer to the compressor upstream passage relative to the exhaust gas recirculation valve.

2. The internal combustion engine according to claim 1, further comprising a catalyst arranged in the exhaust passage and for purifying exhaust gas,
wherein the exhaust gas recirculation passage is connected to the exhaust passage on a downstream side of the catalyst.

* * * * *